(12) United States Patent
Fujino et al.

(10) Patent No.: US 7,518,331 B2
(45) Date of Patent: Apr. 14, 2009

(54) AC ROTATING ELECTRIC MACHINE CONTROL METHOD AND ELECTRICAL POWER TRAIN SYSTEM

(75) Inventors: Shinichi Fujino, Chiyoda-ku (JP); Toshiyuki Innami, Chiyoda-ku (JP); Keita Hashimoto, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 601 days.

(21) Appl. No.: 11/117,504

(22) Filed: Apr. 29, 2005

(65) Prior Publication Data

US 2005/0242759 A1 Nov. 3, 2005

(30) Foreign Application Priority Data

Apr. 30, 2004 (JP) .............................. 2004-135157

(51) Int. Cl.⁸ .............................. H02P 1/46; H02P 3/18; H02P 6/00; H02P 23/00; H02P 25/00; H02P 27/00
(52) U.S. Cl. ........................ 318/712; 318/432; 318/629; 318/713; 318/714
(58) Field of Search ................... 318/432, 629, 712–714

(56) References Cited

U.S. PATENT DOCUMENTS 5,650,713 A * 7/1997 Takeuchi et al. .............. 322/16

7,279,855 B2 * 10/2007 Tahara et al. ................... 318/46
2002/0074803 A1 6/2002 Kajiura

FOREIGN PATENT DOCUMENTS

| EP | 0 954 092 A2 | 11/1999 |
| EP | 1 108 606 A2 | 6/2001 |
| EP | 1 219 493 A1 | 7/2002 |
| JP | 2004-007964 | 1/2004 |

OTHER PUBLICATIONS

European Search Report dated May 21, 2007 (Three (3) pages).

* cited by examiner

*Primary Examiner*—Walter Benson
*Assistant Examiner*—Erick Glass
(74) *Attorney, Agent, or Firm*—Crowell & Moring LLP

(57) ABSTRACT

Solving Means: A field coil current and a stator current are controlled by a controller. The stator current is controlled under vector control and is controlled so that the phase keeps an efficient motor zone. In a case of rated power generation, when the motor speed is low, the phase current and field coil current are increased to reserve the generated power. And, as the speed is increased, the phase current is decreased to reduce the copper loss, while in place of decreasing the phase current, the field coil current is kept high to reserve the generated power. Thereafter, as the speed is increased more, the field coil current is decreased to reduce the iron loss, while in place of decreasing the field coil current, the phase current is increased to reserve the generated power.

18 Claims, 7 Drawing Sheets

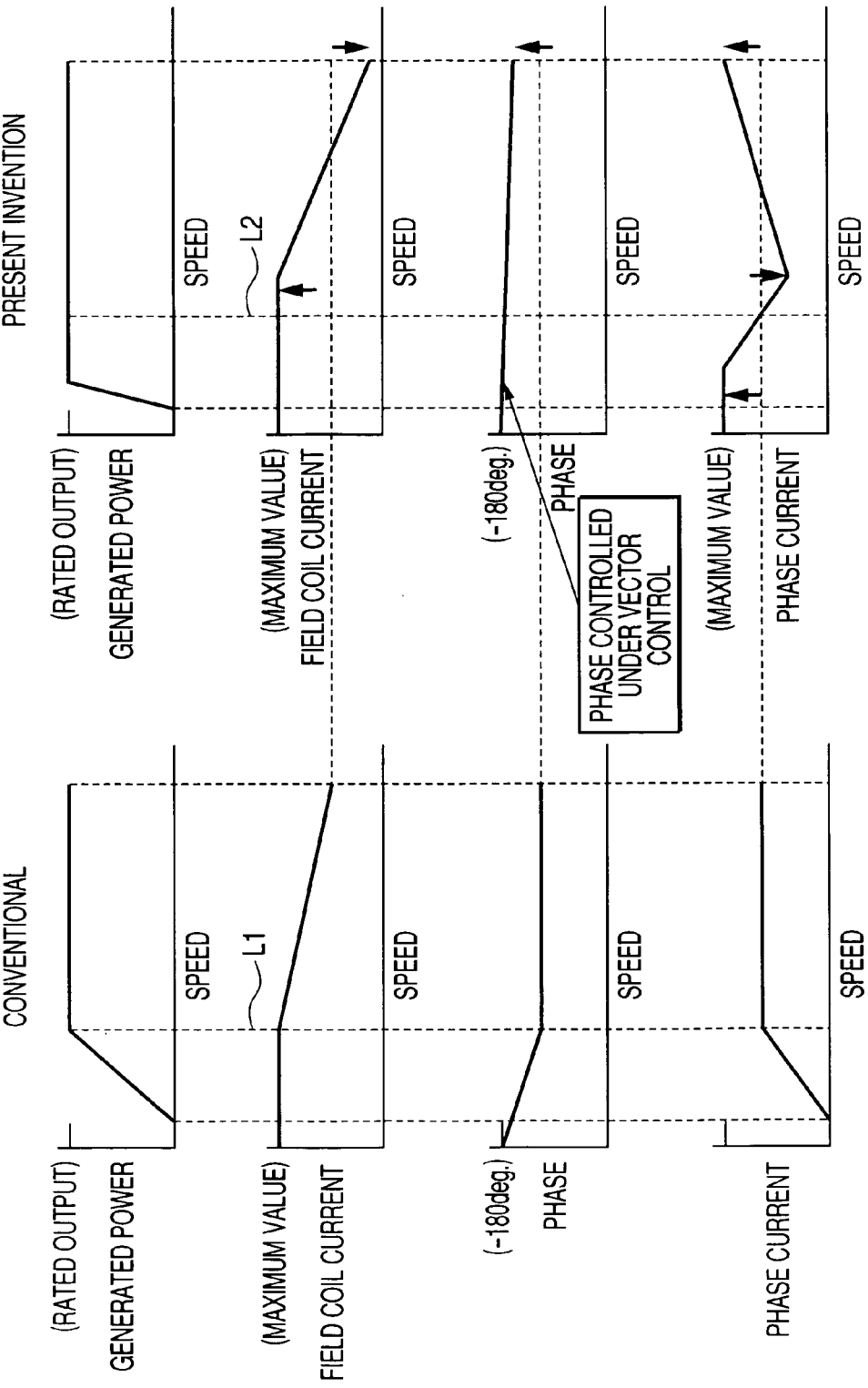
FIG. 6(a) CONVENTIONAL
FIG. 6(b) PRESENT INVENTION
WHEN RATED POWER GENERATED

AC ROTATING ELECTRIC MACHINE CONTROL METHOD AND ELECTRICAL POWER TRAIN SYSTEM

CLAIM OF PRIORITY

The present application claims priority from Japanese application serial no. 2004-135157, filed on Apr. 30, 2004, the content of which is hereby incorporated by reference into this application.

FIELD OF THE INVENTION

The present invention relates to a field wound-rotor type AC rotating electric machine control method, an electrical power train system having a field wound-rotor type rotating electric machine, and a mobile body having the aforementioned electrical power train system.

BACKGROUND OF THE INVENTION

In recent years, in a mobile body, for example, an electrical power train system of a car, to realize various functions such as engine start, booster acceleration, movement start, brake regeneration, and mobile device driving at the time of idle stop, a field wound-rotor type AC rotating electric machine has been used. As such an AC rotating electric machine, conventionally, for example, the one described in Japanese Patent Laid-open No. 2004-7964 is known.

SUMMARY OF THE INVENTION

For an electrical power train system loaded in a car, from the viewpoint of improvement of fuel expenses and countermeasures for an increase in the quantity of electricity due to an increase in mobile electric load, realization of higher efficiency is required. Therefore, for the field wound-rotor type AC rotating electric machine constituting the electrical power train system, further loss reduction is required.

Further, in the electrical power train system, a power transducer for controlling the AC rotating electric machine is installed. For a switching element constituting the power transducer, so as to withstand a voltage increase caused when an electrical connection between the mobile power source and the power transducer is cut due to disconnection of the power line electrically connecting the mobile power source and the power transducer or disconnection of the power line from the mobile power source, a high electric strength semiconductor element is used. However, to realize higher efficiency and further cost reduction of the electrical power train system, it is desirable to rationalize the electric strength of the semiconductor element.

The present invention provides an AC rotating electric machine control method for realizing high efficiency of an electrical power train system. Further, the present invention provides a highly efficient electrical power train system. Furthermore, the present invention provides a mobile body having a highly efficient electrical power train system.

The basic characteristic of the present invention is to control a current flowing through a field winding of the AC rotating electric machine, control the power transducer, and control a current flowing through a multi-phase armature winding of the AC rotating electric machine.

The present invention controls both the current flowing through the field winding and the current flowing through the multi-phase armature winding, so that the loss of the AC rotating electric machine can be rationalized.

DETAILED DESCRIPTION OF THE INVENTION

According to the present invention, the loss of the AC rotating electric machine can be rationalized, so that high efficiency of the electrical power train system can be realized.

BRIEF DESCRIPTION OF DRAWINGS

FIG. 6(a) is an illustration relating to the conventional control which is control of only the field coil current and FIG. 6(b) is an illustration relating to the control of the present invention which is control of both the stator current and field coil current.

DESCRIPTION OF THE PREFERRED EMBODIMENTS

Hereinafter, the embodiment of the present invention will be explained with reference to the accompanying drawings. FIG. 1 shows the constitution of the electrical power train system of this embodiment.

Figure 1A:
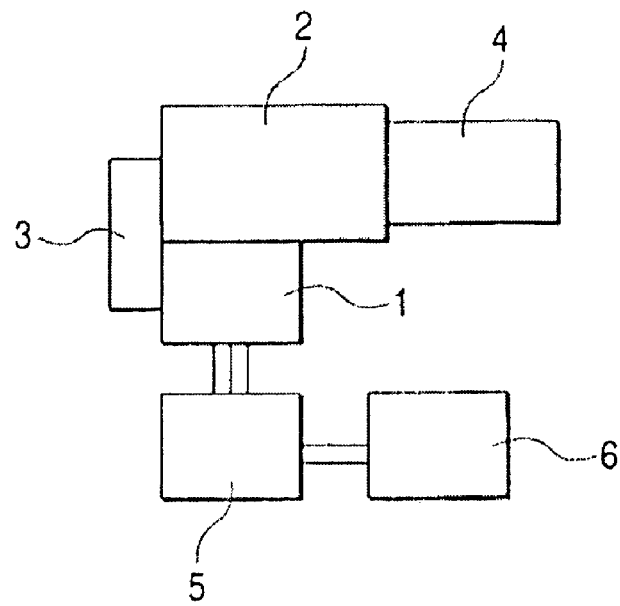
FIG. 1 is drawings showing examples of a system to which the present invention is applied, and FIGS. 1(a) and (b) are block diagrams showing a motor generator system used in a car.
FIG. 1(c) is a block diagram showing a motor four-wheel driving system used in a car.
Figure 1B:
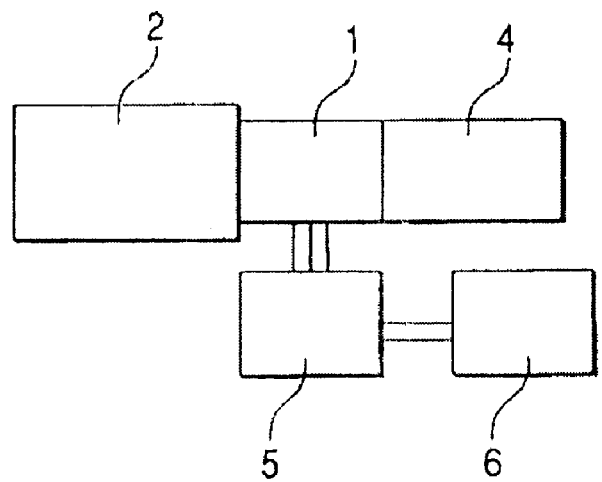
Figure 1C:
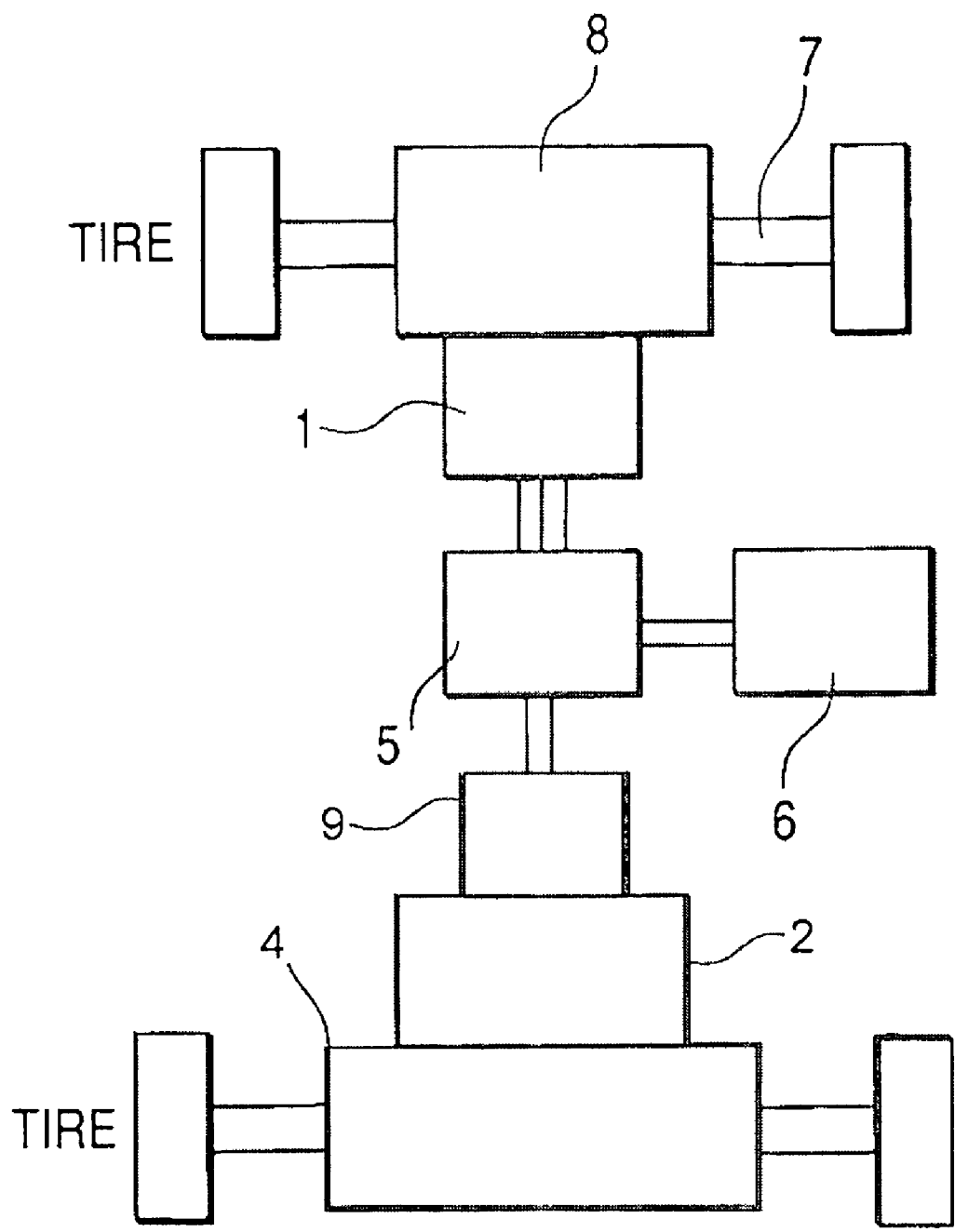

FIGS. 1(a) and (b) show a motor generator system applied to a hybrid car. FIG. 1(c) shows an electric four-wheel driving system applied to a four-wheel drive car.

A car to which the motor generator system shown in FIG. 1(a) is applied is a hybrid car having both an engine power train using an engine 2, which is an internal combustion engine, as a power source and an electric power train using an AC rotating electric machine such as AC rotating electric machine 1 as a power source. The engine power train mainly constitutes a driving source of the car. The electric power train is mainly used as a starting source of the engine 2, as an assist source of the engine 2, and as power source of the car. Therefore, this car can execute the so-called idle stop that the engine 2 is stopped when an ignition key switch is turned on and the car stops to wait for the signal and the engine 2 restarts at the time of car start.

The rotation driving force of the engine 2 is shifted by a transmission 4 and is transferred to a differential gear not drawn. The differential gear is a differential mechanism, which distributes the rotation driving force of the engine 2 transferred via the transmission 4 to left and right front axles. By doing this, the front wheels installed at the ends of the front axles are rotated by the rotation driving force of the engine 2 and the car is driven. Further, in this embodiment, an example using the front wheel driving method is explained. However, the car may be driven using the rear wheel driving method.

The AC rotating electric machine 1 is a field wound-rotor type motor generator which will be described later and is mechanically connected to the engine 2. By doing this, the rotation driving force of the AC rotating electric machine 1 can be transferred to the engine 2 and the rotation driving force of the engine 2 is transferred to the AC rotating electric machine 1. The AC rotating electric machine 1 and the engine 2 are mechanically connected by stretching a belt 3 between the pulley installed on the crank shaft of the engine 2 and the pulley installed on the rotation shaft of the AC rotating electric machine 1. Further, in the motor generator system shown in FIG. 1(b), the AC rotating electric machine 1 is built in the transmission 4 and the AC rotating electric machine 1 and the engine 2 are mechanically connected in this state. The other constitution is similar to that of the motor generator system shown in FIG. 1(a).

To the AC rotating electric machine 1, a battery 6 is electrically connected via an inverter 5. The inverter 5 is a power transducer, which converts DC power supplied from the battery 6 to three-phase AC power and supplies it to the AC rotating electric machine 1. Further, the inverter 5 converts the three-phase AC power supplied from the AC rotating electric machine converts to DC power and supplies it to the battery 6. The battery 6 is a high voltage battery constituting a high-voltage (42 V) power source of the car and is used as a driving power source of the AC rotating electric machine 1. In addition to this, the battery 6 is used as an actuator power source of an injector (a fuel injection valve) for controlling the fuel amount fed to the engine 2 and as an actuator power source of a throttle valve for controlling the air amount fed to the engine 2. For the battery 6, for example, a lithium ion battery at a battery voltage of 36 V is used.

To the battery 6, a battery not drawn is electrically connected via a DC-DC converter not drawn. The battery not drawn is a one at a lower voltage than that of the battery 6, which constitutes a lower voltage (14 V) power source of the car and is used as a starter for starting the engine 2 and as a power source of a radio set and a light. To the battery not drawn, DC power of the battery 6 is dropped in voltage and is supplied by the DC-DC converter not drawn. The battery not drawn charges the DC power dropped in voltage by the DC-DC converter not drawn. Further, for the battery not drawn, for example, a lead battery at a battery voltage 12 V is used.

A car to which the motor generator systems shown in FIGS. 1(a) and (b) are applied has a plurality of operation modes, which control driving the motor generator systems according to the operation modes. When the engine 2 is in the initial start mode, that is, when the engine 2 is in a cold state, to turn on the ignition key switch to start the engine 2, that is, to cold-start the engine 2, the DC power is supplied from the low voltage battery not drawn to the starter not drawn and the starter is driven to rotate, and the engine 2 is started.

When the engine 2 is in the re-start mode (idle stop mode), that is, when the engine 2 is in a warm state and the ignition key switch is on, when stopping the engine 2 at the time of stop due to waiting for the signal and restarting (hot starting) the engine at the time of restart, the AC rotating electric machine 1 is operated as a motor and the rotation driving force of the AC rotating electric machine 1 is transferred to the engine 2. By doing this, the engine 2 is restarted.

Further, in the idle stop mode, when the idle stop conditions are set such that the charging amount of the battery 6 is insufficient and the engine 2 is not warmed up sufficiently, the engine 2 is stopped and is continuously driven. Further, when the engine is in the idle stop mode, it is necessary to reserve the driving source of the auxiliary devices using the engine 2 as a driving source such as the compressor of the air conditioner. In this case, the AC rotating electric machine 1 drives the auxiliary devices as a driving source.

When the engine is in the acceleration mode or the high load operation mode, the load for the engine 2 is increased, so that the AC rotating electric machine 1 is operated as a motor and the rotation driving force of the AC rotating electric machine 1 is transferred to the engine 2. By doing this, the driving by the engine 2 is assisted. When the charging amount of the battery 6 is lower than a predetermined value, the air to fuel ratio of the engine 2 is changed to respond to it.

When the engine is in the charging mode (low load operation mode) requiring charging of the battery 6, the AC rotating electric machine 1 is driven to rotate by the engine 2, that is, the AC rotating electric machine 1 is operated as a generator to generate power. By doing this, the battery 6 is charged. When the engine is in the regeneration mode such as braking or deceleration of the car, the kinetic energy of the car is transferred to the AC rotating electric machine 1 to drive the AC rotating electric machine 1 to rotate. By doing this, the battery 6 is charged.

A four-wheel driving car to which the electric four-wheel driving system shown in FIG. 1(c) is applied is structured so as to drive the front wheels by an engine not drawn which is an internal combustion engine and to drive the rear wheels by the AC rotating electric machine 1. Further, in this embodiment, a case that the front wheels are driven by the engine and the rear wheels are driven by the AC rotating electric machine 1 is explained. However, the rear wheels may be driven by the engine and the front wheels may be driven by the AC rotating electric machine 1.

To the axles of the front wheels, an engine 2 is mechanically connected via differential gears not drawn and a transmission 4 to transfer the rotation driving force of the engine. To the engine 2, a generator 9 is mechanically connected. To axles 7 of the rear wheels, the AC rotating electric machine 1 is mechanically connected via a mechanism 8 composed of speed reducers, clutches, and differential gears. To the AC rotating electric machine 1, the battery 6 is electrically connected via the inverter 5. The generator 9 driven by the engine 2 is electrically connected to the inverter 5 and the battery 6.

The four-wheel driving car, in the four-wheel driving mode, travels by driving the rear wheels to rotate by the rotation driving force of the AC rotating electric machine 1. In this case, the AC rotating electric machine 1 operates as a motor using the generator or battery 6 as a power source and generates rotation driving force. The generated rotation driving force is transferred to the rear wheel axles 7 via the mechanism 8. By doing this, the rear wheels are driven to rotate. Further, the AC rotating electric machine 1 may full-time drive the rear wheels to rotate or until a predetermined car speed is obtained after starting of a car or when a slip (a speed difference between the front wheels and the rear wheels) occurs, the rear wheels may be limitedly driven to rotate.

When the four-wheel driving car is in the regeneration mode, the kinetic energy of the car is transferred to the AC rotating electric machine 1 via the mechanism 8 to drive the AC rotating electric machine 1 to rotate and generates power. By doing this, the battery 6 is charged.

Next, the constitution of the AC rotating electric machine 1 of this embodiment and the circuit configuration of the electrical power train system of this embodiment will be explained.

Figure 2:
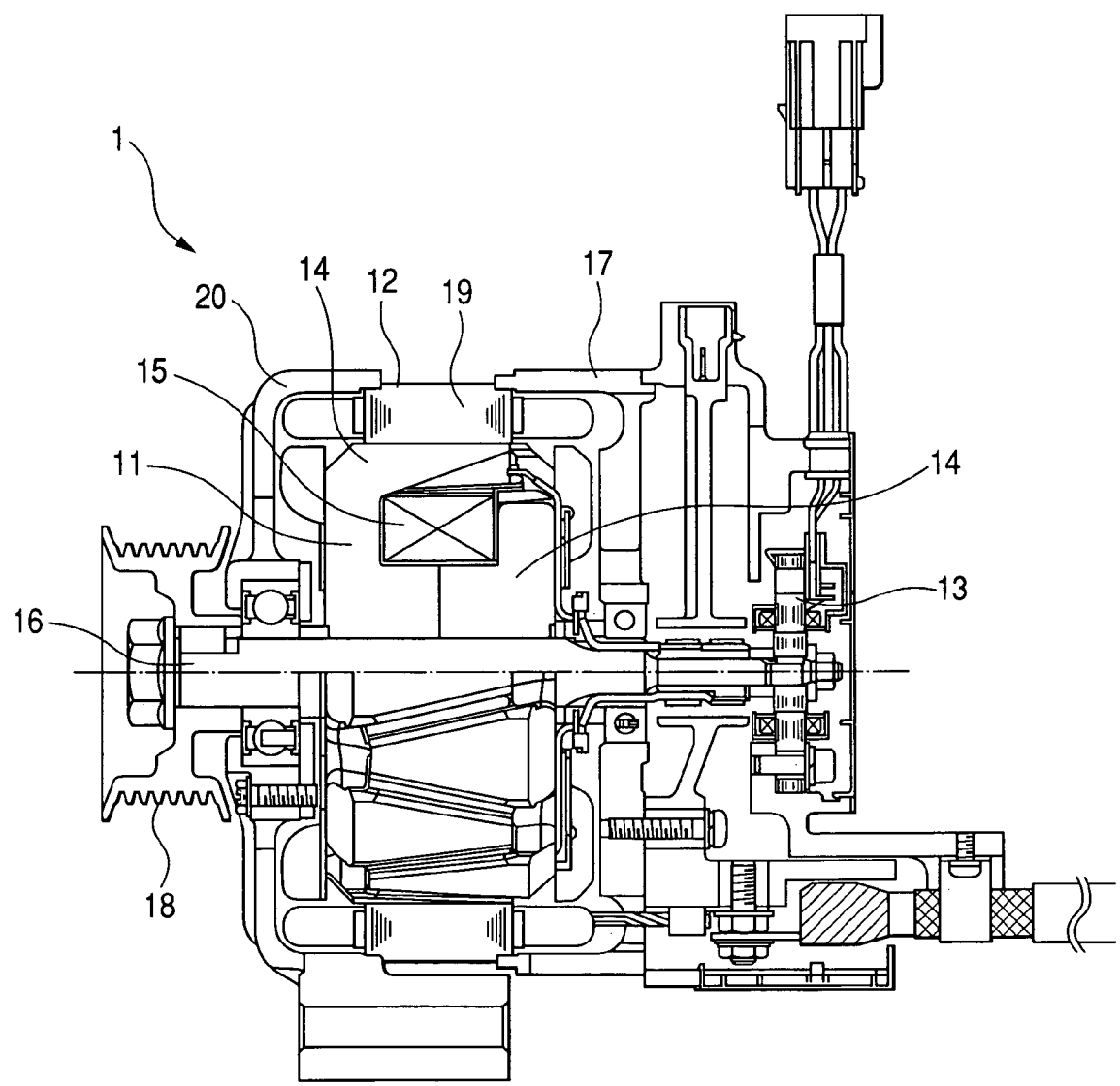
FIG. 2 is a cross-sectional view for explaining the constitution and structure of the AC rotating electric machine.

In FIG. 2, the AC rotating electric machine 1 is composed of a rotor 11, a stator 12, and a rotation sensor 13. The rotor 11 is a part functioning as a field system and is composed of a pole core 14 winding a field coil 15 which is fit into a shaft 16. The shaft 16 is rotatably supported by bearings and at the front end of the part exposed from a case 17, a pulley 18 is attached. The pulley 18 is wound by the aforementioned belt 3 (refer to FIG. 1). The rotor 11, when a current flows through the field coil 15, is structured so that one pole core 14 is set to the North Pole and the other pole core 14 is set to the South Pole. On the outer peripheral side of the rotor 11, the stator 12 is arranged opposite to it via air gaps. The stator 12 is composed of a stator core 19 arranged around the pole core 14 and three sets of stator coils 20 (20u, 20v, 20w) wound round the stator core 19. The stator 12 is structured so as to generate a three-phase alternating current in correspondence to the rotation of the rotor 11.

Figure 3:
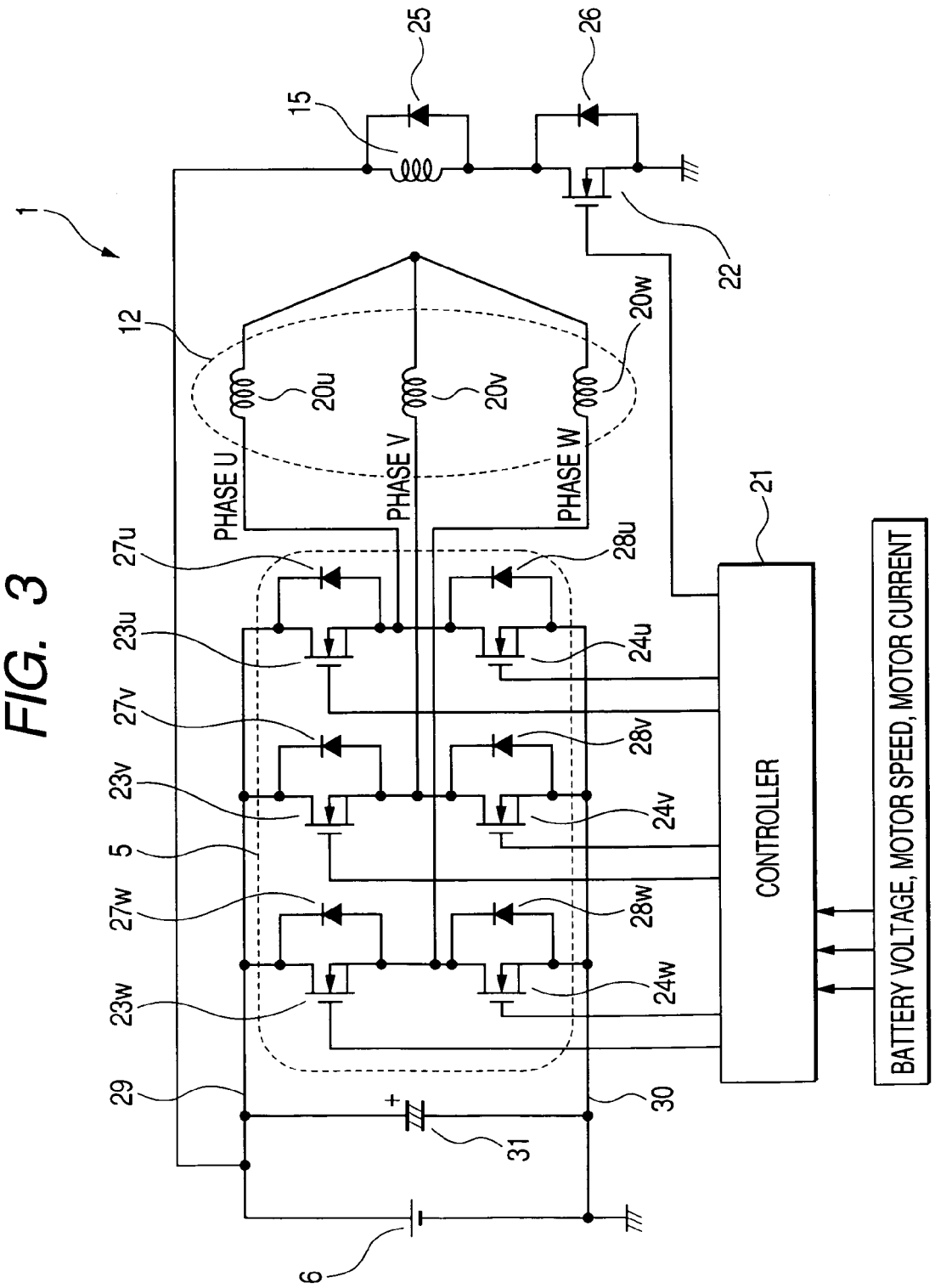
FIG. 3 is a circuit diagram relating to the AC rotating electric machine.

In FIG. 3, the current (field coil current (field current)) flowing through the field coil 15 and the current (stator current) flowing through the stator coils 20u, 20v, and 20w are controlled by a controller 21. The controller 21, though particularly not drawn, is composed of a CPU, a memory, and various drivers. To the controller 21, the battery voltage, motor speed, and motor current are inputted. The controller 21, to disconnect or connect the field coil current (field current), is structured so as to control the switching timing of a MOS-FET 22. Further, the controller 21 is structured so as to control the switching timing of six MOS-FETs 23u, 23v, 23w, 24u, 24v, and 24w of the inverter 5 connected between the stator coils 20u, 20v, and 20w and the battery 6.

One terminal of the field coil 15 is connected to the battery 6. Further, the other terminal of the field coil 15 is connected to the MOS-FET 22. To the field coil 15, a fly-wheel diode 25 is connected. Between the collector and the emitter of the MOS-FET 22, a fly-wheel diode 26 is connected. Further, also between the collectors and the emitters of the MOS-FETs 23u, 23v, 23w, 24u, 24v, and 24w of the inverter 5, fly-wheel diodes 27u, 27v, 27w, 28u, 28v, and 28w are connected. The input terminal of the inverter 5 is connected to DC buses 29 and 30. Further, the output terminal of the inverter 5 is connected to respective one terminals of the stator coils 20u, 20v, and 20w. The respective other terminals of the stator coils 20u, 20v, and 20w are commonly connected. Between the DC buses 29 and 30 at the position between the inverter 5 and the battery 6, an electrolytic capacitor 31 is connected.

Figure 4:
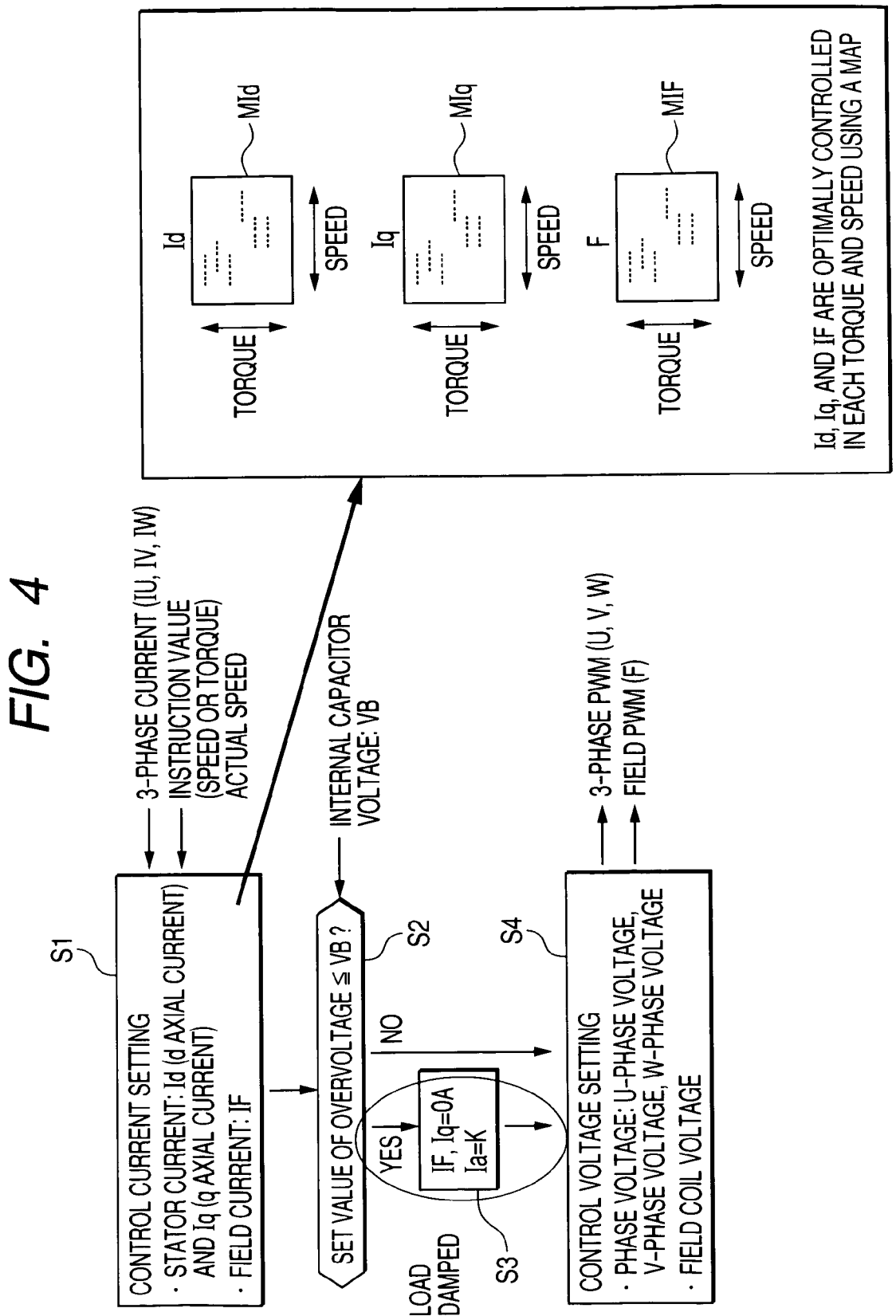
FIG. 4 is a control flow chart.

In the aforementioned constitution, the AC rotating electric machine 1 is controlled so as to execute the processes at the respective Steps S1 to S4 of the control flow shown in FIG. 4.

In FIG. 4, at Step S1, the AC rotating electric machine 1 executes a setting process of a control current. Concretely, on the basis of the three-phase currents (IU, IV, IW), instruction values (speed, torque), and actual speed which are input to the controller 21, the AC rotating electric machine 1 sets stator currents Id (d axial current) and Iq (q axial current) and a field coil current (field current) IF. When supplemented regarding setting of the stator currents Id and Iq and setting of the field coil current IF, although not particularly limited, using a map MId for setting the stator current Id, a map MIq for setting the stator current Iq, and a map MIF for setting the field coil current IF, optimal set values on the basis of each torque and speed are obtained. And, they are set as currents.

At Step S2, a process of judging whether the internal capacitor voltage VB is higher than a preset overvoltage (set value of overvoltage≦VB) or not is performed. When the internal capacitor voltage VB is higher than the set value of overvoltage (yes at Step S2), it is judged that the load is damped, that is, the battery 6 is disconnected and the process goes to Step S3. On the other hand, when the internal capacitor voltage VB is lower than the set value of overvoltage (no at Step S2), it is judged as the normal process and the process goes to Step S4.

Figure 5:
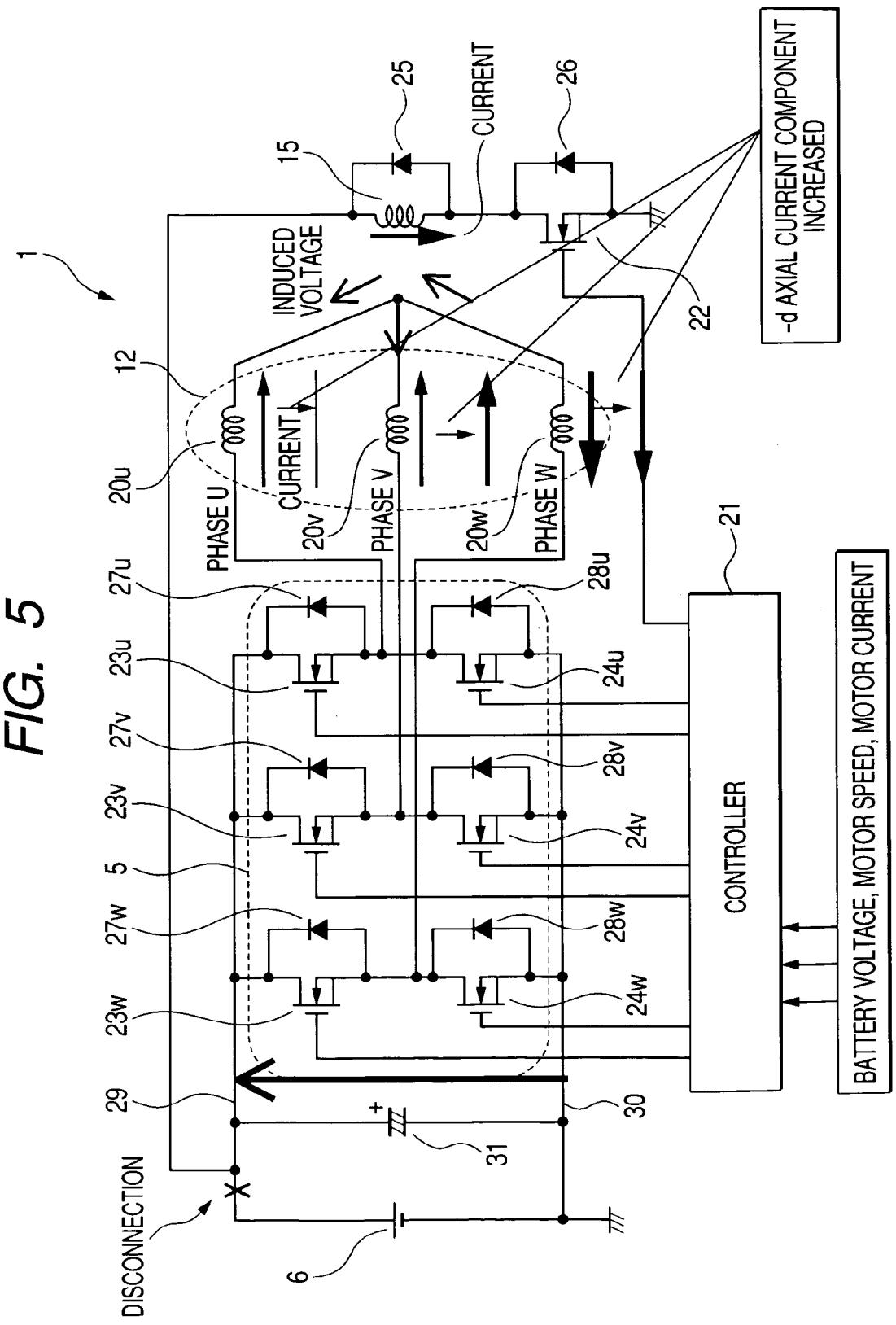
FIG. 5 is a circuit diagram when the battery is disconnected.

At Step S3, a process is performed that the stator currents Id and Iq and the field coil current IF which are set at Step S1 are canceled, and the stator current Iq and the field coil current IF are set to 0 A, and the stator current Id is set to K A which is a predetermined value. The process at Step S3, as shown in the circuit diagram at the time of disconnection of the battery in FIG. 5, is a process necessary to increase the current of the −d axial component under vector control at the time of disconnection and suppress induced voltages generated in the stator coils 20u, 20v, and 20w. When the current of the −d axial component is increased, as shown in FIG. 5, the currents of the phases U and W are decreased and the current of the phase V is increased. Further, the time constant of the stator coils is several tens µs, and the time causes voltage rise by the current energy ½LI$^2$ of the phase current, though it is not questionable because it is absorbed by the electrolytic capacitor. Under such control, the voltage rise is suppressed, and the breakdown voltage can be rationalized, and high efficiency and low cost are realized. When the process at Step S3 is finished, the process goes to Step S4.

At Step S4, a control voltage setting process is performed. Concretely, to generate a PWM signal, the aforementioned set current is converted to a voltage, thus phase voltages (U-phase voltage, V-phase voltage, W-phase voltage) are set and a field coil voltage is set.

Then, control when rated power is generated will be explained using an example. FIG. 6(a) is an illustration relating to conventional control which is control only of the field coil current and FIG. 6(b) is an illustration relating to control of this embodiment which is control of both the stator current and field coil current. Comparison of FIG. 6(a) with FIG. 6(b) shows that there is a clear difference between the conventional control and the control of this embodiment and the difference is a characteristic of this embodiment.

In FIG. 6(a), the generated power of the AC rotating electric machine 1 increases as the speed of the AC rotating electric machine 1 increases and when the speed reaches a certain motor speed, that is, reaches the motor speed of at the position of the line L1 shown in the drawing, a rated voltage is obtained. The field coil current at that time reaches a maximum value when the power does not increase, and when the motor speed increases, the induced voltage increases in correspondence to it, so that control is executed so as to decrease the field coil current. The phase, when the power is not increased, enters into a state close to −180° and when the phase current increases, it is shifted and settles down to −260° or so. In the conventional case, only the field coil current is controlled and the phase cannot be controlled. The phase current is fixed at the position of the line L1. The phase current is fixed without reaching its maximum value.

In FIG. 6(b), in this embodiment, the field coil current and stator current are controlled, that is, they are controlled under vector control and controlled so that the phase keeps an efficient motor zone. The reason is that both the field coil current and stator current are controlled, thus the loss is optimized, and the efficient is increased higher than the conventional. More concretely, when the speed of the AC rotating electric machine 1 is low, the phase current and field coil current are increased to reserve the generated power. And, as the speed increases, the phase current is reduced to decrease the copper loss, and on the other hand, the field coil current is kept large in place of reducing the phase current to reserve the generated power. Thereafter, as the speed increases more, the field coil current is reduced to decrease the iron loss, and on the other hand, the phase current is increased in place of reducing the field coil current to reserve the generated power. Further, the line L2 shown in the drawing is drawn in the same position as that of the line L1 shown in FIG. 6(a). For the field coil current and stator current, on the basis of the speed and torque and when necessary, the temperature and voltage, a control current is set, for example, using a map, thus optimal control is realized.

In this embodiment, when the engine 2 of a car to which the motor generator system shown in FIGS. 1(a) and (b) is applied is in the restart mode, so as to set the field current to its maximum value, the q axial current component of the stator current to its maximum value, and the d axial current component of the stator current to a value according to the speed of the AC rotating electric machine 1, the field current and stator current are controlled. When the engine 2 is in the acceleration mode or the high load operation mode, so as to set the field current, for example, from the maximum value to 0, the q axial current component of the stator current, for example, from the maximum value to 0, and the d axial current component of the stator current to a value according to the speed of the AC rotating electric machine 1, the field current and stator current are controlled. When the engine 2 is in the charging mode or the regeneration mode, as explained in FIG. 6, so as to set, according to the speed of the AC rotating electric machine 1, the field current, q axial current component of the stator current, and d axial current component of the stator current respectively to values for maximizing the efficiency of the AC rotating electric machine 1, the field current and stator current are controlled.

Further, when a car to which the four-wheel driving system shown in FIG. 1(c) is applied is in the four-wheel driving mode, so as to set the field current, q axial current component of the stator current, and d axial current component of the stator current respectively to values suited for the AC rotating electric machine 1 to output maximum torque at the time of a low speed when the car starts to move and thereafter as the car speed increases, for the torque of the AC rotating electric machine 1 to reduce, the field current and stator current are controlled. When the car is in the regeneration mode, as explained in FIG. 6, so as to set, according to the speed of the AC rotating electric machine 1, the field current, q axial current component of the stator current, and d axial current component of the stator current respectively to values for maximizing the efficiency of the AC rotating electric machine 1, the field current and stator current are controlled.

As explained by referring to FIGS. 1 to 6, in this embodiment for controlling the magnitude of the field coil current and simultaneously controlling the stator current under the vector control of the inverter 5, high efficiency of the electrical power train system can be realized. Further, the controller 21 outputs a PWM (pulse width modulation) signal and controls both currents.

This embodiment includes the control of increasing the d axial current component in one direction at the time of disconnection of the battery and suppressing the induced voltage, so that the element used can be optimized and low cost and miniaturization can be realized. Namely, when the battery is disconnected, vector control of increasing the d axial current component in one direction (the −d axial current component is increased) is executed and as a result, the induced voltage is suppressed. The time constant of the stator coil is several tens Is and the time causes voltage rise by the current energy ½L.I2 of the phase current, though it is absorbed by the electrolytic capacitor. Therefore, the voltage rise is suppressed, and the breakdown voltage can be rationalized, and high efficiency and low cost are realized.

In a mobile body such as a car having the electrical power train system of this embodiment, high efficiency and low cost can be realized.

Additionally, needless to say, within a range which is not deviated from the object of the present invention, the present invention can be modified variously.

What is claimed is:

1. A control method for a field wound-rotor type AC rotating electric machine including a stator having a multi-phase armature winding electrically connected to a power source via a power transducer and a rotor having a field winding, comprising the steps of:

controlling a current flowing through said field winding and controlling said power transducer and a current flowing through said multi-phase armature winding, wherein said control method controls variously and harmoniously both said current flowing through said field winding and said current flowing through said multi-phase armature winding.

2. An AC rotating electric machine control method according to claim 1, wherein:

said control method, according to a speed of said AC rotating electric machine, controls said current flowing through said field winding and said current flowing through said multi-phase armature winding.

3. An AC rotating electric machine control method according to claim 2, wherein:

said control method, on the basis of a torque instruction value outputted from a host controller, controls said current flowing through said field winding and said current flowing through said multi-phase armature winding.

4. An AC rotating electric machine control method according to claim 1, wherein in response to an increase in a rotational speed of the AC rotating electric machine, the current flowing through the field winding is decreased and the current flowing through said multi-phase armature winding is increased to maintain a power output by the rotating electric machine.

5. A control method for a field wound-rotor type AC rotating electric machine including a stator having a multi-phase armature winding electrically connected to a power source via a power transducer and a rotor having a field winding, comprising the steps of:

controlling a current flowing through said field winding and controlling said power transducer and a current flowing through said multi-phase armature winding, wherein, when said electrical connection between said power source and said power transducer is cut, a d-axial current component of said current flowing through said multi-phase armature winding is increased in one direction.

6. An AC rotating electric machine control method according to claim 5, wherein:

a voltage increase due to said cutting is absorbed by an electrolytic capacitor electrically connected between said power source and said power transducer.

7. An electrical power train system loaded on a car having a mobile power source, comprising:

a rotating electric machine and a controller for controlling said rotating electric machine, wherein:

said rotating electric machine is of an AC type using a field winding and includes a stator having a multi-phase armature winding and a rotor rotatably installed on said stator via air gaps, said multi-phase armature winding is electrically connected to said mobile power source via said controller, said rotor has the field winding, and said controller controls a current flowing through said multi-phase armature winding and a current flowing through said field winding, wherein said controller, according to an operation status of said car, controls variously and harmoniously both said current flowing through said multi-phase armature winding and said current flowing through said field winding.

8. An electrical power train system loaded in a car having a secondary battery as a mobile power source for transferring rotation driving force of an internal combustion engine as one driving source of said car to axles via a transmission and driving wheels to rotate, comprising:

a rotating electric machine mechanically connected to said internal combustion engine and a controller for controlling said rotating electric machine, wherein:

said rotating electric machine is of an AC type using a field winding, which is a motor generator operating as a motor when power supplied from said mobile power source is supplied via said controller and operating as a generator when driven from said internal combustion engine and includes a stator having a multi-phase armature winding and a rotor rotatably installed on said stator via air gaps, said multi-phase armature winding is electrically connected to said mobile power source via said controller, said rotor has the field winding, and said controller controls a current flowing through said multi-phase armature winding and a current flowing through said field winding, wherein said controller, according to an operation status of said car, in said both operations when said rotating electric machine operates as a motor and operates as a generator, controls variously and harmoniously both said current flowing through said multi-phase armature winding and said current flowing through said field winding.

9. An electrical power train system according to claim 8, wherein:

said rotating electric machine, after said car is stopped and said internal combustion engine is stopped, when said internal combustion engine is restarted, receives said power supplied from said mobile power source via said controller, thereby operates as a motor and starts said internal combustion engine and when said mobile power source is required to be charged or said car is in a damping state, is driven by said internal combustion engine or kinetic energy of said car, thereby operates as a generator and supplies said generated power to said mobile power source via said controller.

10. An electrical power train system according to claim 8, wherein:

said rotating electric machine is installed side by side in said internal combustion engine and is mechanically connected to said internal combustion engine by a belt.

11. An electrical power train system according to claim 8, wherein:

said rotating electric machine is built in a transmission and is mechanically connected to said internal combustion engine.

12. An electrical power train system according to claim 8, wherein:

said controller includes field control means for controlling said current flowing through said field winding, power conversion means for controlling said current flowing through said multi-phase armature winding, and control means for controlling said field control means and said power conversion means.

13. A mobile body comprising an electrical power train system stated in claim 8.

14. An electrical power train system according to claim 8, wherein:

in response to an increase in rotational of speed said rotating electrical machine while the electrical machine operates as a generator, the controller decreases the current flowing through the field winding and increases the current flowing through said multi-phase armature winding to maintain a power output by the rotating electric machine.

15. An electrical power train system loaded in a car for driving a driving shaft of one wheel among a plurality of wheels by rotation driving force of an internal combustion engine using said internal combustion engine as one driving source of said car and driving a driving shaft of another one wheel among said plurality of wheels by motor-driven force, including a power transfer mechanism installed on said driving shaft driven by said motor-driven force and a generator driven by a secondary battery as a mobile power source and said internal combustion engine, comprising:

a rotating electric machine mechanically connected to said power transfer mechanism and a controller for controlling said rotating electric machine, wherein:

said rotating electric machine is of an AC type using a field winding, which is a motor generator operating as a motor when power supplied from said secondary battery or said internal combustion engine is supplied via said controller and operating as a generator when driven by kinetic energy of said car and includes a stator having a multi-phase armature winding and a rotor rotatably installed on said stator via air gaps, said multi-phase armature winding is electrically connected to said mobile power source via said controller, said rotor has the field winding, and said controller controls a current flowing through said multi-phase armature winding and a current flowing through said field winding, wherein said controller, according to an operation status of said car, in said both operations when said rotating electric machine operates as a motor and operates as a generator, controls variously and harmoniously both said current flowing through said multi-phase armature winding and said current flowing through said field winding.

16. An electrical power train system according to claim 15, wherein:

said rotating electric machine, when assisting driving of said car by said internal combustion engine, receives said power supplied from said mobile power source via said controller, thereby operates as a motor, and assists driving of said car by said internal combustion engine and when said car is in a damping state, is driven by kinetic energy of said car, thereby operates as a generator, and supplies said generated power to said secondary battery via said controller.

17. An electrical power train system according to claim 15, wherein:

said controller includes field control means for controlling said current flowing through said field winding, power conversion means for controlling said current flowing through said multi-phase armature winding, and control means for controlling said field control means and said power conversion means.

18. A mobile body comprising an electrical power train system stated in claim 15.

* * * * *